Nov. 17, 1959   J. C. BLEAZEY   2,913,644
VARIABLE CAPACITOR
Filed July 9, 1956   2 Sheets-Sheet 1
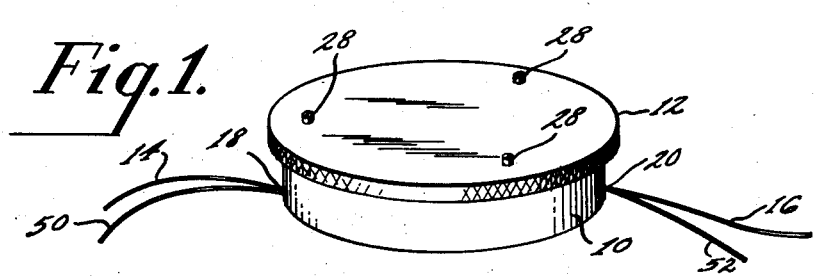
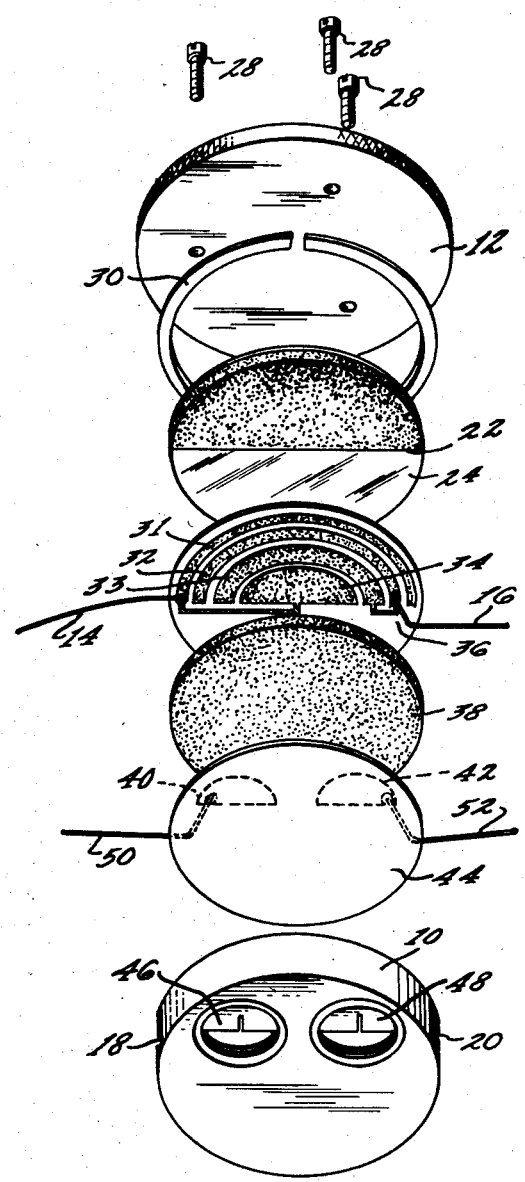
INVENTOR.
John C. Bleazey
BY
ATTORNEY.

Nov. 17, 1959 J. C. BLEAZEY 2,913,644
VARIABLE CAPACITOR
Filed July 9, 1956 2 Sheets-Sheet 2

INVENTOR.
John C. Bleazey
BY H.C.Newton
ATTORNEY.

United States Patent Office 2,913,644
Patented Nov. 17, 1959

2,913,644

VARIABLE CAPACITOR

John C. Bleazey, Trenton, N.J., assignor to Radio Corporation of America, a corporation of Delaware Application July 9, 1956, Serial No. 596,598

4 Claims. (Cl. 317—249)

This invention relates to variable capacitors, and more particularly relates to continuously variable multi-section capacitors for the tuning of signal receivers and the like.

In the development of electronic equipment such as radio signal receivers, the trend toward miniaturization has resulted in demands for smaller and smaller component parts. This has been particularly true with respect to variable tuning capacitors, the most commonly used type being the parallel-plate, air-dielectric type of capacitor which is relatively bulky in size, and requires a disproportionate space for installation in proportion to other electronic components in a receiver. When these capacitors are used as the tuning elements for radio receivers, two or more units are mechanically ganged together for unicontrol operation, adding even further to the size of the unit.

It is an object of this invention to provide an improved multi-section variable tuning capacitor, of reduced size and simple construction, which can be uniformly made in large quantities at low cost.

It is a further object of this invention to provide an improved plural-section variable tuning capacitor, having a high dielectric material between the plates thereof, which can uniformly and easily be reproduced without requiring precision manufacturing techniques.

The multi-section variable capacitor of the invention includes a common capacitor plate, and at least two separate capacitor plates for cooperation therewith supported as a unit parallel to and closely adjacent the common plate, but separated therefrom by a suitable insulating material having a high dielectric constant. The common plate and the unit comprising the two separate capacitor plates are relatively movable to simultaneously vary the capacitance between the common plate and each of the separate plates. If both the common capacitor plate and the unit comprising the separate capacitor plates have relatively rigid flat planar surfaces, minor deformities in one or the other of the surfaces introduces air gaps adjacent the dielectric material which seriously affect the incremental change in capacitance of the particular capacitor section adjacent the air gap, and prevent accurately controlled tracking of the capacitance of the different sections of the variable capacitor. This, of course, is undesirable in most instances such as where the different sections of the variable capacitor are used to tune the signal selection and oscillator circuits of a radio receiver in predetermined tracking relation over a range of signal frequencies.

In accordance with the invention, one of the relatively movable elements has a rigid flat planar surface and the other is made relatively flexible. A resilient pressure pad is positioned to urge the flexible element into intimate conformity with the surface of the rigid element, with only the dielectric material being interposed therebetween, thereby avoiding air pockets and insuring accurate tracking of the capacitance of the different sections of the variable capacitor.

If the dielectric material separating the capacitor plates is non-uniform in thickness, or in dielectric constant, the tracking between the different sections may be affected. To average out these non-uniformities and further in accordance with the invention, the separate capacitor plates which are supported as a unit are subdivided into a plurality of plate sections which are preferably positioned in parallel relation, and predetermined ones of these plate sections are conductively connected together to form the separate capacitor plates. At least one of the separate capacitor plates is comprised of plate sections which are separated by the plate sections of another capacitor plate. In this manner the effect of the non-uniform dielectric material is averaged out so that accurately controlled tracking between the different capacitor sections is attained even with non-uniform dielectric material.

A further object of this invention is to provide an improved multi-section tuning capacitor of the type having relatively high dielectric-constant material interposed between the plates thereof wherein non-uniformities of the dielectric material are balanced out to permit controlled tracking relation of the capacitance between the separate sections of the capacitor.

A still further object of this invention is to provide an improved variable capacitor which has a minimum amount of stray capacitance between the plates thereof, thereby providing large minimum-to-maximum capacitance ratio so that when the capacitor is connected in the tuning circuit of a signal receiver, a wide tuning range can be achieved with a relatively smaller tuning unit.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1 is a perspective view of a multi-section miniature variable tuning capacitor embodying the invention;

Figure 2 is an exploded view of the multi-section miniature variable tuning capacitor of Figure 1 showing the various elements thereof;

Figure 7:
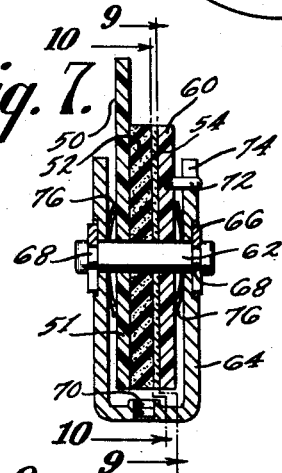
Figure 8:
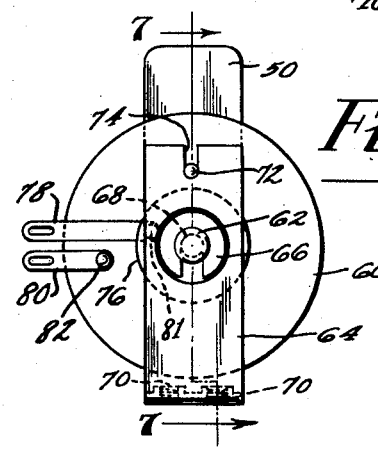
Figures 9, 10:
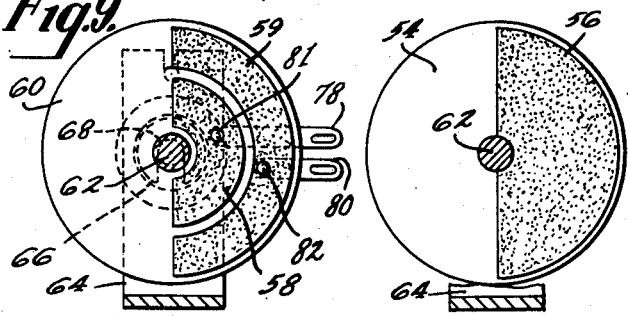

Figure 7 is a sectional view of the variable capacitor shown in Figure 8 taken on the section lines 7—7; and Figure 8 is a front elevational view of a multi-section miniature variable capacitor illustrating a modification of the variable capacitor of Figure 1 in accordance with the invention; and Figures 9 and 10 are plan views of the stator and rotor plates respectively of the variable capacitor shown in Figures 7 and 8.

Referring now to the drawings, and particularly to Figure 1, the multi-section miniature capacitor of the invention comprises a casing 10 having a rotatable control member or disc 12 which forms a closure member therefor and is operable upon rotation to vary the capacitance of the device. The control member 12 is slightly larger in diameter than the casing 10, and has a knurled edge so that the capacitor may be mounted in a suitable cabinet, such as that of a radio receiver, with only the knurled edge of the control member 12 protruding from the cabinet. A capacitor rotor plate is directly fastened to the control disc 12 for movement thereby. The rotor plate is conductively connected to the casing 10, and the casing provides a common terminal for the separate sections of the variable capacitor. The conductors 14 and 16 which extend through the apertures 18 and 20, respectively, in the side of the casing 10, are connected to two separate stator plates, which are positioned with respect to the rotor plate such that the capacitance between the rotor plate and each of the stator plates is simultaneously varied on rotation of the rotor plate. The conductors 14 and 16 represent any terminal means for the stator plates of the capacitor suitably insulated from the casing 10, for connection with external electrical circuits such as the signal selection and oscillator circuits of a radio receiver.

Figure 3:
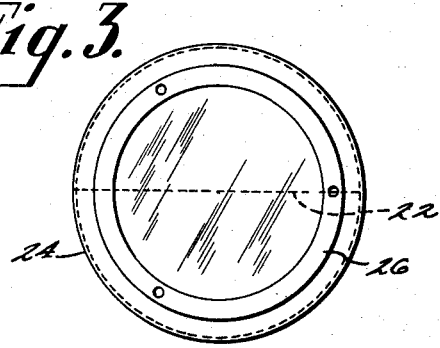
Figures 3 and 4 are plan and side views respectively of the rotor plate of the variable capacitor shown in Figure 1.
Figure 4:
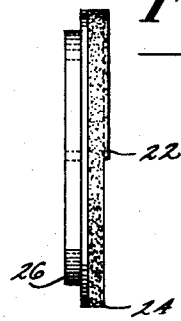

Referring to the exploded view shown in Figure 2, the components of the two-section miniature variable capacitor within the casing 10 comprise a rotor plate 22 which consists of a thin conductive film or coating on one face or side of a relatively rigid flat insulating disc 24. The rotor plate 22 which has a semi-circular configuration may be formed on or affixed to the disc 24 in any suitable manner. In the embodiment disclosed, the plate is formed by depositing a thin film of copper over the entire disc 24, and selectively etching away the undesired portions. The rotor plate 22 is conductively connected by a portion of the conductive coating, which extends over the edge of the disc 24 to the opposite side thereof, to a conductive mounting ring 26 shown in Figures 3 and 4. The mounting ring 26 is cemented or otherwise suitably fastened to the disc 24 concentrically therewith, and has three tapped holes for receiving screws 28 which pass through the control member 12. A circular expandable spring 30 which is held in an annular groove, not shown, extending around the inside of the casing 10 near the top side thereof, bears against the conductive mounting ring to retain the various components in the casing 10. The spring 30, through contact with the ring 26, also insures a positive electrical connection between the rotor plate 22 and the casing 10.

The stator plates for the capacitor comprise four separate parallel concentric conductive coatings 31, 32, 33 and 34 formed on or affixed to a thin flexible sheet or disc of dielectric material 36. As in the case of the rotor plate, the stator plates may be thin copper segments formed by etching away a portion of a coating on the disc. The dielectric sheet 36, which may be of any material having suitable dielectric characteristics, such as Teflon for example, separates the stator plates from the rotor plate 22. The conductive coatings occupy a semicircular portion of the dielectric sheet 36 which is of approximately the same size as the rotor plate 22. The conductive coatings are positioned for complete registry with the rotor plate 22 in the position shown in Figure 2, and to be completely out of registry with the rotor plate when the rotor plate is rotated 180°. This construction provides very little stray capacitance between the plates of the tuning capacitor. The advantage of minimizing stray capacitance between the rotor and stator plates is to enable a lower minimum capacitance and thereby increasing the minimum to maximum capacitance ratio. This is of importance if the capacitor is to be used as the tuning element of a signal receiver in order that the proper tuning range be provided.

Figure 5:
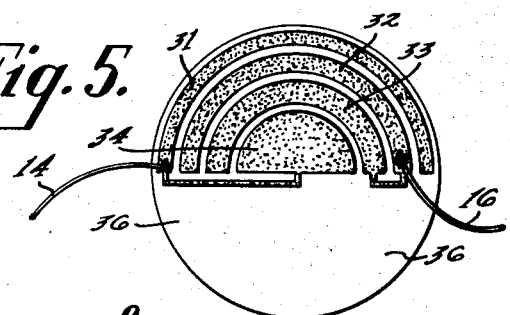
Figures 5 and 6 are plan and side views respectively of the stator plates of the variable capacitor shown in Figure 1.
Figure 6:
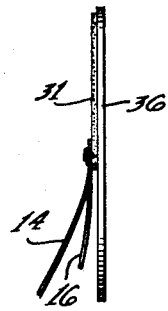

As can be seen in Figure 2 and by reference to Figure 5, the conductive coatings 31 and 34 are conductively connected together to form one stator plate and the coatings 32 and 33 are connected together to form the second capacitor plate. The reason for this construction and connection is to average out any non-uniformities in the dielectric material 36, which might otherwise affect the tracking of the two capacitor sections as the rotor plate is rotated. Tracking as used herein means that the capacitance vs. rotor position curve of one of the variable capacitors is related in a predetermined manner to the capacitance vs. rotor position curve of the other variable capacitor. In other words, the two variable capacitors should have equal or properly related capacitance for all positions of the rotor plate, 22, or they might have capacitances which differ by a common amount over the entire range, etc.

A flat resilient circular pad 38 of sponge rubber or other suitable resilient material is positioned between the bottom of the casing 10 and the flexible dielectric sheet 36. The pad 38 is ordinarily under compression when all the parts are assembled in the casing 10, and serves to press the flexible dielectric sheet 36 into intimate conforming engagement with the surface of the rotor plate 22 eliminating air pockets which might otherwise occur between the rotor plate and the dielectric. Even a very small air space would effect the capacitance considerably and prevent controlled tracking of the capacitance between the two main variable capacitor sections. For example, if the air space occurs near one of the stator plates, the incremental change in capacitance with movement of the rotor plate will be relatively much less than if the air space did not exist, while the incremental change in capacitance of the other capacitor will be of the normally expected amount.

A trimmer capacitor is provided for each of the separate variable capacitor sections, which comprises a pair of relatively small capacitor plates 40 and 42 formed on a dielectric disc 44. The dielectric disc 44 is positioned at the bottom of the casing 10 beneath the resilient pad 38. The trimmer capacitor plates are semi-circular in configuration and are positioned adjacent respective circular holes in the bottom of the casing 10. Semi-circular conductive slugs 46 and 48 are supported in these holes by suitable fittings for rotational movement. In the position shown in Figure 2, the slugs 46 and 48 are in substantially complete registry with the trimmer capacitor plates 40 and 42. By rotating the slugs the capacitance between the trimmer plates 40 and 42 and the casing 10 may be selectively varied to the desired value. A conductor 50 is soldered or otherwise conductively connected to the trimmer plate 40 and is adapted to be connected with the conductor 14 so that the capacitance between the trimmer plate 40 and the rotary slug 46 is added to and trims the capacitance between the stator plates 31-34 and the rotor plate 22. Likewise, a conductor 52 is conductively connected to the trimmer plate 42 and is adapted to be connected in a similar manner with the conductor 16 so that the capacitance between the trimmer plate 42 and the rotary slug 48 is the trimming capacitance for the capacitor formed by the rotor plate 22 and the stator plates 32—33.

When the various parts of the capacitor are positioned in the casing 10, the spring 30 urges the rotor disc 24 down into the casing against the pressure of the pad 38. As mentioned above, the pad 38 urges the dielectric sheet which supports the stator plates against the rotor disc 24. As the rotor disc 24 is rotated by the control member 12, the capacitance between the rotor plate 22 and each of the stator plates is simultaneously varied, and the constant pressure of the pad 38 continues to maintain the intimate conformity of the dielectric sheet 36 with the rotor disc 24. The construction described enables the manufacture of a simplified variable capacitor without involving precision techniques. For example, if both the rotor and stator plates presented relatively rigid flat surfaces, it would be necessary to grind or otherwise form the surfaces optically flat in order to eliminate the air pockets which would affect the tracking between the capacitor sections.

It is apparent from the construction shown in Figure 2, that the stator plates may be affixed directly to the surface of the resilient pad 38 with which they are in operating contact, in which case a dielectric coating such as a silicone varnish applied over the rotor plate 22 may serve as a dielectric medium in place of the flexible sheet 36.

Referring now to Figures 5 to 8, it will be seen that a modification in construction may be provided in which the resilient pad and flexible plate unit may be made rotatable while the rigid plate is retained in a fixed position. In this modification, the miniature variable capacitor comprises a movable control member 50 which may, for example, comprise a tab on a circular backing plate 51 of phenolic insulating base material. Cemented or otherwise fastened to the circular phenolic backing plate 51 is a circular resilient pad 52 which may be of any suitable material such as sponge rubber or the like. A thin flexible high-dielectric sheet 54 which supports one of the capacitor plates 56 is secured to the resilient pad 52, the whole assembly including the circular phenolic backing plate 51 and the resilient pad 52 and dielectric sheet 54 being adapted to rotate upon movement of the tab 50. The capacitor plate 56 which is the rotor element, comprises a thin layer of conductive material affixed to the flexible dielectric sheet 54 which is semi-circular in configuration.

A pair of conductive stator plates 58 and 59 are suitably formed on one face of a circular insulating base 60 which may comprise a sheet of phenolic or ceramic material. If desired, the stator plates 58 and 59 may be pressed into the base 60 so that a flush surface is presented to the dielectric sheet 54 to reduce wear. The stator plates 58 and 59 occupy a semi-circular area on the base 60, and are positioned to be in complete registry with the rotor plate 56 in one position thereof, and completely out of registry when the rotor plate 56 is rotated 180°.

The backing plates 51, resilient pad 52, and dielectric sheet 54 are all mounted on a rotatable shaft 62 which passes through a central aperture in these members. The shaft 62 also passes through a central aperture in the base 60, but the base 60 is fixed against rotation. The shaft 62 is supported by a U-shaped bracket 64 and is retained in position by two slotted washers 66 which are held in the grooves 68 adjacent each end of the shaft 62. The U-shaped bracket 64 is provided with a pair of threaded apertures 70 for mounting purposes. The rotor plate 56 is conductively connected to the shaft 62, and through the shaft to the bracket 64 so that the bracket provides a common electrical terminal for the capacitor unit.

The base 60 is fixed against rotation by means of a pin 72 preferably in the form of a self-tapping drive screw which is fixed in an aperture in the base 60 and projects into a slot 74 formed in one of the parallel arms of the bracket 64.

To obtain the highest possible maximum capacity and to insure tracking between the two variable capacitor section 56—58 and 56—59, intimate contact must be maintained between the surfaces of the rotor plate 56 and the stator plates 58—59 to eliminate the possibility of air pockets between the dielectric sheet 54 and the stator plate. In other words, the insulating backing plate 51 and the base 60, should be pressed together to place the dielectric sheet 54 and resilient pad 52 which is sandwiched therebetween under compression. To this end a pair of dished spring washers 76 are fixed in position on the shaft 62 in a suitable manner, as shown, to urge the backing plate 51 and the base 60 together. In this manner, the resilient pad 52 which is reinforced by the backing plate 51, and presses the dielectric sheet 54 intimately against the surface of the insulating base 60. If desired, a dielectric coating, in place of the dielectric sheet 54, may be applied over the stator plates 58 and 59. In this case, the flexible rotor plate 56 may be affixed to the pad 52 to follow the surface of the dielectric on the base 60.

The U-shaped bracket 64 which is connected to the rotor plate 56 by way of the shaft 62 provides the common electrical connection terminal for the two sections of the variable capacitor. In the usual case, the bracket is at ground potential since it is usually fastened directly to the chassis of the equipment with which the capacitor is used. A pair of electric terminal connectors 78 and 80 are supported on the opposite side of the insulating base 60, from the stator plates 58 and 59. The terminal connectors 78 and 80 are connected to the stator plates 58 and 59 respectively by conductor pins 81 and 82 (Figure 9) which pass through apertures in the base 60.

The multi-section miniature variable capacitor described can be constructed at low cost using mass production techniques. The capacitor includes pressure which urges the flexible plates of the capacitors into intimate conformity with the rigid flat plate with only the high dielectric material interposed therebetween. This construction eliminates air gaps and insures an accurately controlled tracking relation between the capacitances of the various capacitor sections. To substantially eliminate tracking errors due to non-uniformities in the dielectric material, the plates of the separate capacitors are divided into a plurality of sections which are preferably positioned in parallel relation and connected together to average out such non-uniformities.

What is claimed is:

1. A multi-section variable capacitor comprising in combination, a stator member comprising a flexible sheet of dielectric material, a rotor member of insulating material having a substantially flat rigid surface in contact with one side of said stator member, a pair of flat conductive capacitor plates on the opposite side of said stator member each individual to one section of said variable capacitor, said rotor member including on the flat surface thereof at least one flat conductive capacitor plate common to both capacitor sections, said flexible sheet of dielectric material of the stator member being thereby interposed between the common capacitor plate of said rotor member and the pair of capacitor plates as the dielectric means for said capacitor, means including a pressure pad resiliently engaging and holding said flexible stator member in intimate conformity with the flat surface of said rotor member thereby to eliminate air pockets between the rotor capacitor plate and said dielectric means, and means for relatively moving said rotor and stator members about an axis normal to the flat surface of the rotor member to vary the relative positions of and the capacitance between the respective plates of said capacitor sections in predetermined relation.

2. A multi-section variable capacitor comprising in combination, a flat casing open on one side, a rotatable control member on said casing providing a closure means therefor, stator means in said casing including a flexible flat sheet of dielectric material, first and second flexible flat conductive members affixed to one side of said sheet each providing the stator plate of a section of said variable capacitor, rotor means in said casing including a conductive common capacitor plate for said variable capacitor providing a rigid planar surface in contact with the side of said flexible dielectric sheet opposite said conductive members, a resilient pressure pad positioned in the casing in contact with the side of said flexible dielectric sheet to which said conductive members are affixed, means connected with the casing for applying pressure to said pad to urge said flexible dielectric sheet into intimate contact and conformity with the rigid planar surface of said common capacitor plate thereby to eliminate air pockets and dielectric variations between said plate and said dielectric sheet, and means including said control member for moving the rotor means and the common capacitor plate relative to said flexible dielectric sheet and the conductive members thereon to simultaneously vary the capacitances of said capacitor sections.

3. A multi-section variable tuning capacitor comprising in combination; stator means including a thin flexible sheet of dielectric material, a first conductive planar capacitor plate for one capacitor section having at least two conductively connected sections positioned in spaced relation on one side of said flexible sheet, and a second conductive planar capacitor plate for another of said capacitor sections having at least a portion thereof positioned between the sections of said first capacitor plate on said dielectric sheet; rotor means including a common capacitor plate for said variable capacitor providing a rigid planar surface engaging the side of said dielectric sheet opposite said first and second capacitor plates; means including a resilient pressure pad positioned adjacent the side of said dielectric sheet on which said first and second capacitor plates are positioned for resiliently holding said dielectric sheet in intimate contact and conformity with said planar surface of said rotor means to eliminate air pockets therebetween, and means connected with said rotor means for moving said common capacitor plate relative to said flexible dielectric sheet to simultaneously vary the capacitance between said common capacitor plate and said first and second capacitor plates.

4. A multi-section variable capacitor comprising in combination, a casing, a rotatable control member, stator means in said casing including a flexible flat sheet of dielectric material, first and second flexible flat conductive members affixed to one side of said sheet each providing the stator plate of a section of said variable capacitor, rotor means in said casing including a conductive common capacitor plate for said variable capacitor providing a rigid planar surface in contact with the side of said flexible dielectric sheet opposite said conductive members, a resilient pressure pad positioned in the casing in contact with the side of said flexible dielectric sheet to which said conductive members are affixed, means connected with the casing for applying pressure to said pad to urge said flexible dielectric sheet into intimate contact and conformity with the rigid planar surface of said common capacitor plate thereby to eliminate air pockets and dielectric variations between said plate and said dielectric sheet, and means including said control member for moving the rotor means and the common capacitor plate relative to said flexible dielectric sheet and the conductive members thereon to simultaneously vary the capacitances of said capacitor sections.

References Cited in the file of this patent

UNITED STATES PATENTS

| 1,918,238 | Andrews | July 18, 1933 |
| 2,147,728 | Wintringham | Feb. 21, 1939 |
| 2,244,023 | Sauer | June 3, 1941 |
| 2,535,367 | Minnium | Dec. 26, 1950 |
| 2,591,705 | Kodama | Apr. 8, 1952 |
| 2,693,557 | Kodama | Nov. 2, 1954 |
| 2,776,376 | Slate | Jan. 1, 1957 |
| 2,789,259 | Eisler | Apr. 16, 1957 |